US009042684B2

(12) United States Patent
Gill et al.

(10) Patent No.: US 9,042,684 B2
(45) Date of Patent: May 26, 2015

(54) ELECTRO-OPTIC MODULATOR

(75) Inventors: Douglas M. Gill, South Orange, NJ (US); William M. Green, Astoria, NY (US); Alberto Valdes Garcia, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/603,971

(22) Filed: Sep. 5, 2012

(65) Prior Publication Data

US 2014/0064653 A1    Mar. 6, 2014

(51) Int. Cl.
*G02F 1/035* (2006.01)
*G02F 1/01* (2006.01)

(52) U.S. Cl.
CPC ............ *G02F 1/0356* (2013.01); *G02F 1/0121* (2013.01)

(58) Field of Classification Search
None
See application file for complete search history.

(56) References Cited

U.S. PATENT DOCUMENTS

| | | | |
|---|---|---|---|
| 4,871,223 A * | 10/1989 | Auracher et al. | 385/2 |
| 5,020,872 A * | 6/1991 | DuPuy et al. | 385/16 |
| 5,113,275 A | 5/1992 | Patel et al. | |
| 5,237,629 A * | 8/1993 | Hietala et al. | 385/3 |
| 5,355,422 A * | 10/1994 | Sullivan et al. | 385/1 |
| 5,400,416 A | 3/1995 | Enokihara et al. | |
| 5,453,608 A | 9/1995 | Conder et al. | |
| 6,181,456 B1 * | 1/2001 | McBrien et al. | 359/245 |
| 6,310,700 B1 * | 10/2001 | Betts | 359/2 |
| 6,323,986 B1 | 11/2001 | Lee et al. | |
| 6,369,936 B1 | 4/2002 | Moulin | |
| 6,437,899 B1 | 8/2002 | Noda | |
| 6,990,256 B2 | 1/2006 | Geary et al. | |
| 7,317,846 B2 | 1/2008 | Keil | |
| 7,426,321 B2 | 9/2008 | Eriksson et al. | |
| 7,817,881 B2 | 10/2010 | Li | |
| 7,899,277 B2 | 3/2011 | Koh | |
| 2001/0007508 A1 | 7/2001 | Ooi et al. | |
| 2003/0190107 A1 * | 10/2003 | Walker | 385/2 |
| 2004/0202395 A1 | 10/2004 | Yap et al. | |
| 2005/0123242 A1 | 6/2005 | Walker et al. | |
| 2005/0147136 A1 * | 7/2005 | Pobanz | 372/26 |
| 2007/0009195 A1 * | 1/2007 | Eriksson et al. | 385/2 |
| 2010/0040322 A1 | 2/2010 | Li et al. | |

(Continued)

FOREIGN PATENT DOCUMENTS

JP    11326850 A    11/1999
JP    2003295139 A    10/2003

OTHER PUBLICATIONS

PCT Search Report and the Written Opinion of the International Searching Authority, International Application No. PCT/US13/47773, Mailed Jan. 17, 2014, 10 pages.

(Continued)

*Primary Examiner* — Mike Stahl
(74) *Attorney, Agent, or Firm* — Cantor Colburn LLP; Vazken Alexanian

(57) ABSTRACT

An electro-optical modulator device includes an optical signal path partially defined by a waveguide portion, a radio frequency (RF) signal path partially defined by a conductive line portion, an interaction region where an RF signal propagating in the RF signal path interacts with an optical signal propagating in the optical signal path to modulate the optical signal, and a first tuning portion arranged proximate to the conductive line portion, the first tuning portion including a conductive portion and a switch portion operative to connect the conductive portion to ground.

14 Claims, 7 Drawing Sheets

(56) References Cited

U.S. PATENT DOCUMENTS

| | | |
|---|---|---|
| 2010/0245968 A1 | 9/2010 | Smith et al. |
| 2011/0206322 A1 | 8/2011 | Kucharski et al. |
| 2011/0298561 A1 | 12/2011 | Green et al. |
| 2014/0061450 A1* | 3/2014 | Gill et al. .................. 250/227.11 |

OTHER PUBLICATIONS

PCT Written Opinion of the International Searching Authority, International Application No. PCT/US13/47773, Mailed Jan. 17, 2014, 7 Pages.

Chen et al., "25Gb/s hybrid silicon switch using a capacitively loaded traveling wave electrode," Optics Express, vol. 18, Issue 2, 2010, pp. 1070-1075.

Dummer, M.M., et al., "Widely Tunable 40 Gbps Transmitter Utilizing a High-Impedance Traveling-Wave EAM and SG-DBR Laser," Integrated Photonics and Nanophotonics Research and Applications (IPNRA), Jul. 13, 2008, 3 pages.

Schlafman, S., et al., "Variable transmission lines: Structure and compact modeling," 2011 IEEE International Conference on Microwaves, Communications, Antennas and Electronics Systems (COMCAS), Nov. 7-9, 2011, 4 pages.

Tsuzuki, K., et al., "InP-based n-i-n Mach-Zehnder optical modulator," Electronics and Communications in Japan (Part II: Electronics), vol. 88, Issue 8, Aug. 2005, pp. 1-9.

* cited by examiner

ELECTRO-OPTIC MODULATOR

FIELD OF INVENTION

The present invention relates generally to electro-optic devices and methods, and more specifically, to electro-optic modulators.

DESCRIPTION OF RELATED ART

Electro-optic modulators include an arrangement of optical wave guide portions and conductive line portions. The optical wave guide portions are operative to facilitate the propagation of optical signals and the conductive line portions propagate input radio frequency (RF) signals. The RF signals facilitate an electro-optic effect that changes the refractive index of the waveguide materials when the RF signals interact with the waveguide material. The arrangement provides an interaction between the optical signals and the RF signals such that the optical signals may be modulated by the input RF signals.

BRIEF SUMMARY

According to one embodiment of the present invention, an electro-optical modulator device includes an optical signal path partially defined by a waveguide portion, a radio frequency (RF) signal path partially defined by a conductive line portion, an interaction region where an RF signal propagating in the RF signal path interacts with an optical signal propagating in the optical signal path to modulate the optical signal, and a first tuning portion arranged proximate to the conductive line portion, the first tuning portion including a conductive portion and a switch portion operative to connect the conductive portion to ground.

According to another embodiment of the present invention, an electro-optical modulator device system includes an optical signal path partially defined by a waveguide portion, a radio frequency (RF) signal path partially defined by a conductive line portion, an interaction region where an RF signal propagating in the RF signal path interacts with an optical signal propagating in the optical signal path to modulate the optical signal, a first tuning portion arranged proximate to the conductive line portion, the first tuning portion including a conductive portion and a switch portion operative to connect the conductive portion to ground, and a controller portion communicatively connected to the switch portion of the first tuning portion, the controller portion operative to control a state of the switch portion.

According to yet another embodiment of the present invention, an electro-optical modulator device includes a substrate, a radio frequency (RF) signal path partially defined by a conductive line portion arranged on the substrate, an optical signal path partially defined by a waveguide portion arranged on the substrate, an interaction region where an RF signal propagating in the RF signal path interacts with an optical signal propagating in the optical signal path to modulate the optical signal, and a first tuning portion arranged on the substrate proximate to the conductive line portion, the first tuning portion including a conductive portion and a switch portion operative to connect the conductive portion to ground.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Previous electro-optic modulators included a waveguide portion that propagated optical signals and a conductive line portion that propagated radio frequency (RF) signals. The interaction of the RF signals with the optical signals was operative to modulate the optical signals. Though devices tend to be designed such that the optical signals and the RF signals generally propagate at similar speeds, the materials and the geometry of the electro-optic modulators may affect the relative propagation speeds of the optical signals and the RF signals. If, for example, the propagation speed of the RF signals does not match the propagation speed of the optical signals in the interactive regions of the electro-optical device, the bandwidth of the modulator may be undesirably reduced.

The illustrated exemplary embodiments described herein provide a method and system for matching the propagation speeds of the RF signals with the optical signals in the interaction regions of an electro-optical device while the device is operating. Such matching (or tuning) of the speeds of the signals may increase the effective bandwidth of the electro-optical device and system.

Figure 1:
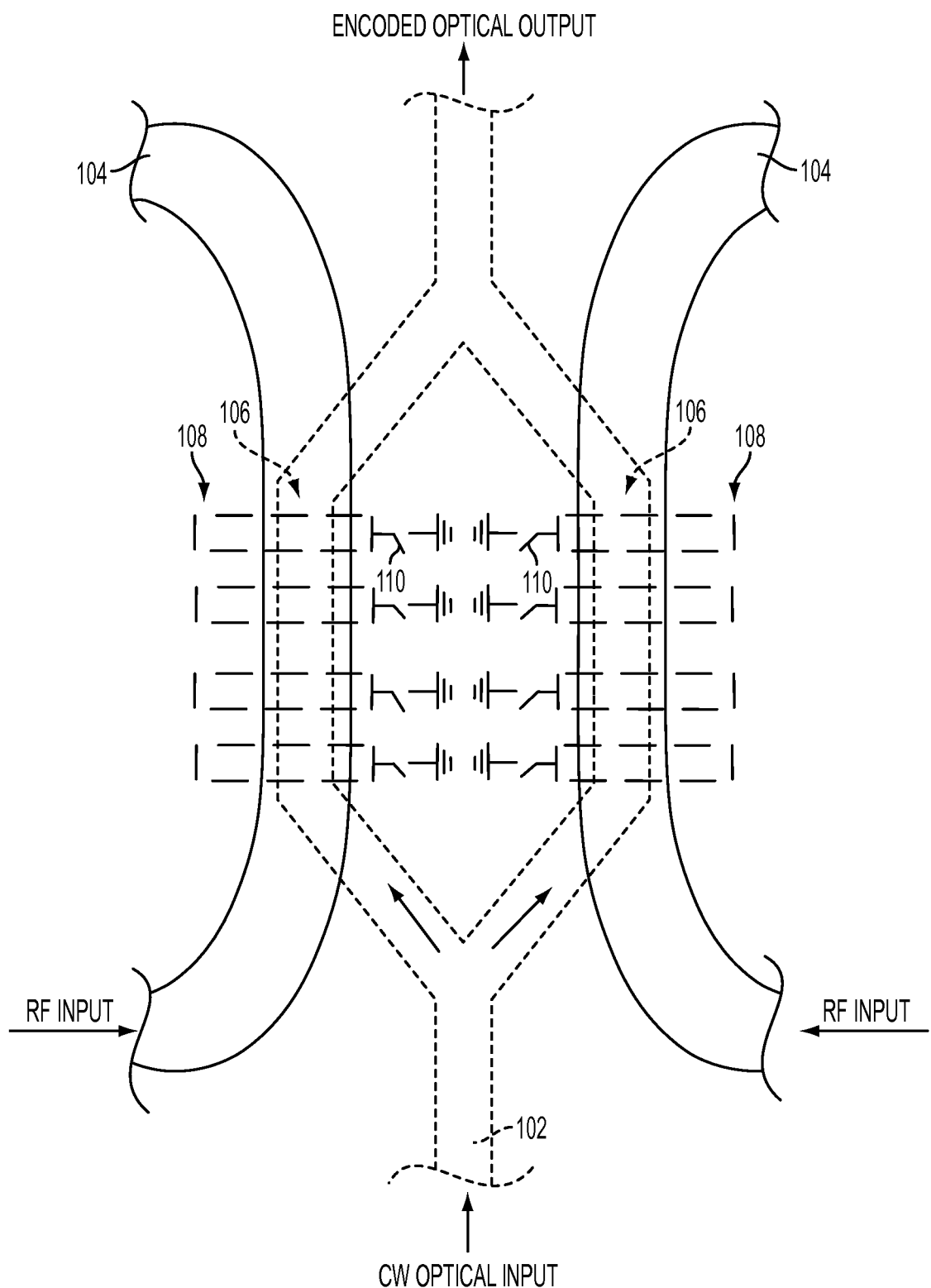
FIG. 1 illustrates a top view of a portion of an exemplary embodiment of an electro-optical modulator device.

FIG. 1 illustrates a top view of a portion of an exemplary embodiment of an electro-optical modulator device 100. In this regard, the device 100 is arranged on a substrate such as for example a silicon substrate material. A waveguide portion 102 is arranged on the substrate. Conductive lines 104 are arranged on a layer over or next to the waveguide portion 102. The waveguide portion 102 is operative to propagate a continuous wave (CW) optical input signal, and the conductive lines 104 are operative to propagate RF input signals. The waveguide portion 102 and the conductive lines 104 overlap in interaction regions 106. The interaction of the RF signal with the waveguide portions 102 in the interaction regions 106 affects the modulation of the CW optical input light resulting in a modulated or encoded optical output signal. As discussed above, the geometry and the materials of the device 100 may affect the propagation speed of the optical and RF signals. In the illustrated exemplary embodiment, the RF signal propagates at a higher speed than the optical signal.

Thus, reducing the propagation speed of the RF signal will reduce the relative difference in propagation speeds between the optical signal and the RF signal.

The group velocity of the RF signal is a function of the line inductance, and the capacitance of the conductive lines 104. Changing the capacitance or inductance of the conductive lines 104 will change the group velocity of the RF signal. The illustrated embodiment includes a plurality of tuning portions 108 that are arranged across or proximate to the conductive lines 104. The tuning portions 108 are electrically insulated from the conductive lines 104, and may be arranged for example, on a layer of material on the substrate that is insulated from the conductive lines 104. Each tuning portion 108 is connected to ground via one or more switch devices 110 that may be controlled by a controller (described below). When the switch devices 110 are closed (i.e., the tuning portion 108 is connected to ground on either one end, opposing ends of the tuning portion 108, or a switch device 110 arranged in the a medial region of the tuning portion 108) for a particular tuning portion 108, the capacitance of the associated conductive line 104 is increased. The increase in the capacitance of the conductive line 104 decreases the velocity of the RF signal propagating in the conductive line 104.

Though the illustrated embodiment includes two tuning portions 108 arranged and associated with each conductive line 104, alternative embodiments may include any number of tuning portions 108 per conductive line 104. Each tuning portion 108 may be individually controlled such that the effective capacitance of the conductive line 104 may be increased incrementally by affecting the switch device(s) 110 connecting particular tuning portion 108 to ground. By changing the states of the tuning portion 108 (i.e., the states of the switch device 110 connecting the tuning portion 108 to ground), the effective capacitance of the conductive lines 104 may be increased or decreased to affect the velocity of the RF signal to approach or substantially match the speed of the optical signal.

Figure 2:
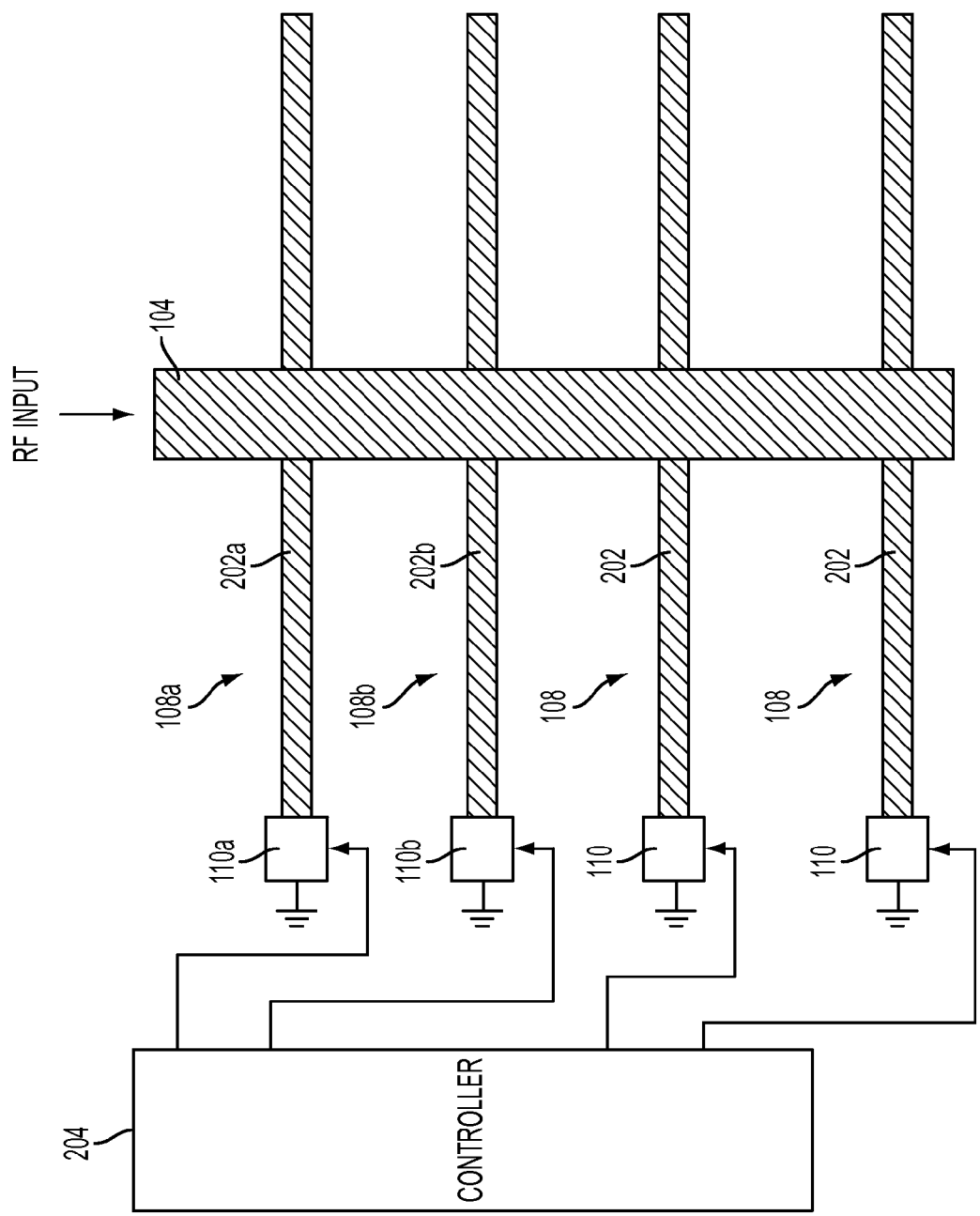
FIG. 2 illustrates a top view of an exemplary arrangement of a conductive line and tuning portion.

FIG. 2 illustrates a top view of an exemplary arrangement of a conductive line 104 and tuning portion 108. The line loading elements include a conductive portion 202 connected to the switch devices 110. Each of the conductive portions 202 may be selectively and individually connected to ground by closing the switch device 110 on an end of the tuning portion 108. The switch devices 110 are controlled by a controller portion 204, which is operative to output signals that change the state of the switch devices 110. The controller portion 204 may include, for example, a processor or a logic circuit operative to receive inputs, and process the input and output signals. In the illustrated embodiment, the controller 204 may close the switch device 110a, which connects the conductive portion 202a to ground. Such a connection results in an increase in the capacitance of the conductive line 104. As discussed above, the increase in the capacitance of the conductive line 104 decreases the velocity of the RF input signal (decreasing the relative difference between the speed of the RF input and the optical signal (described above). If a further reduction of the velocity of the RF input is desired, the controller may, for example, close the switch device 110b to connect the conductive portion 202b to ground, thereby further increasing the capacitance of the conductive line 104. The capacitance may be further increased, if desired, by closing the switch device 110 of other tuning portions 108.

Figure 3:
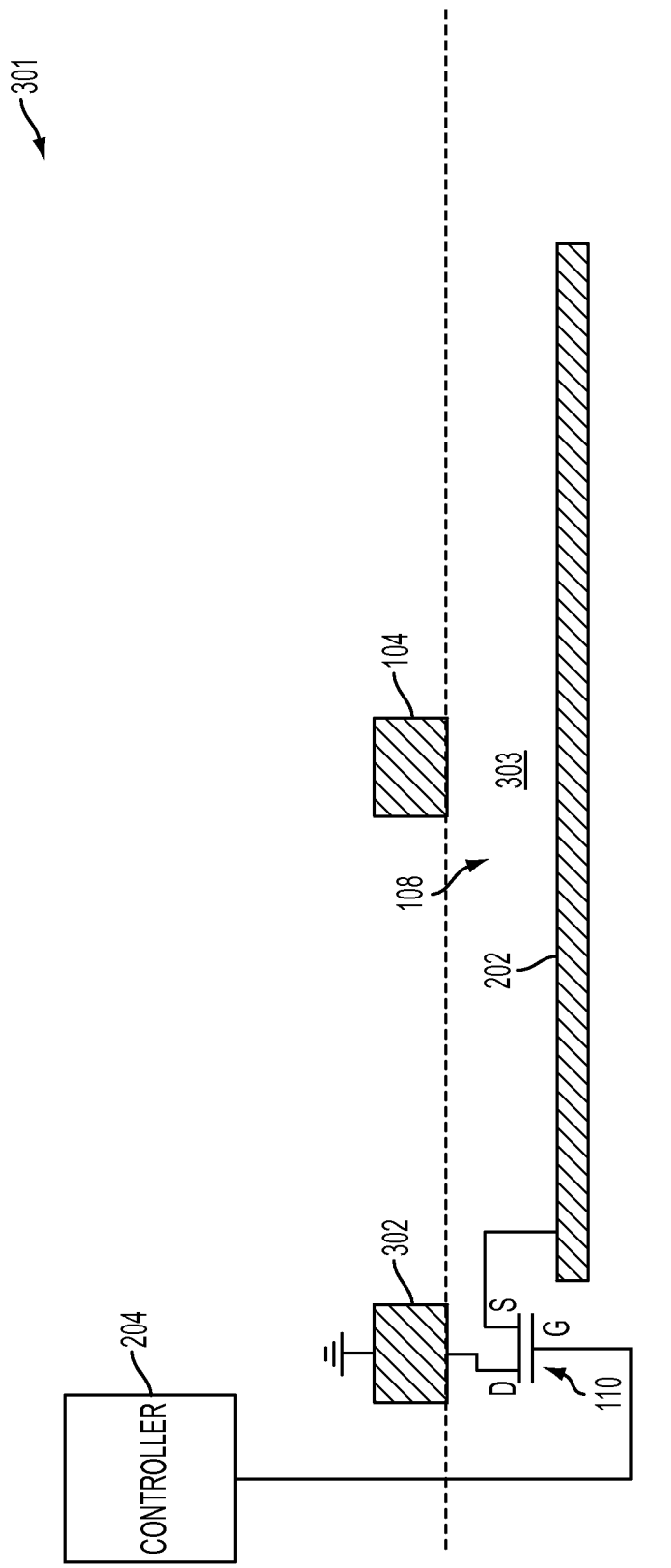
FIG. 3 illustrates a side partially cut-away view of an exemplary embodiment of a tuning portion.

FIG. 3 illustrates a side partially cut-away view of an exemplary embodiment of a tuning portion 108. The conductive portion 202 is connected to the switch device 110. In the illustrated embodiment, the switch device 110 includes one or more transistors. The switch device 110 is connected to ground the node 302 and the controller 204. The tuning portion 108 is arranged in an insulating layer 303, such as, for example, an oxide or nitride material that is disposed on the substrate 301. The conductive line 104 is arranged on the insulating layer 303. Though the illustrated embodiment includes a substrate 301 and an insulating layer 303, the device may include any number of layers including any variety of materials. Though one switch device 110 is shown, alternate embodiments may include two or more switch devices 110 such that each end of the conductive portion 202 is connected to ground via a switch device 110, or alternate embodiments may include a switch device 110 in a medial region of the conductive portion 202 that results in a path to ground between ends of the conductive portion 202 when the switch device 110 is closed.

Figure 4:
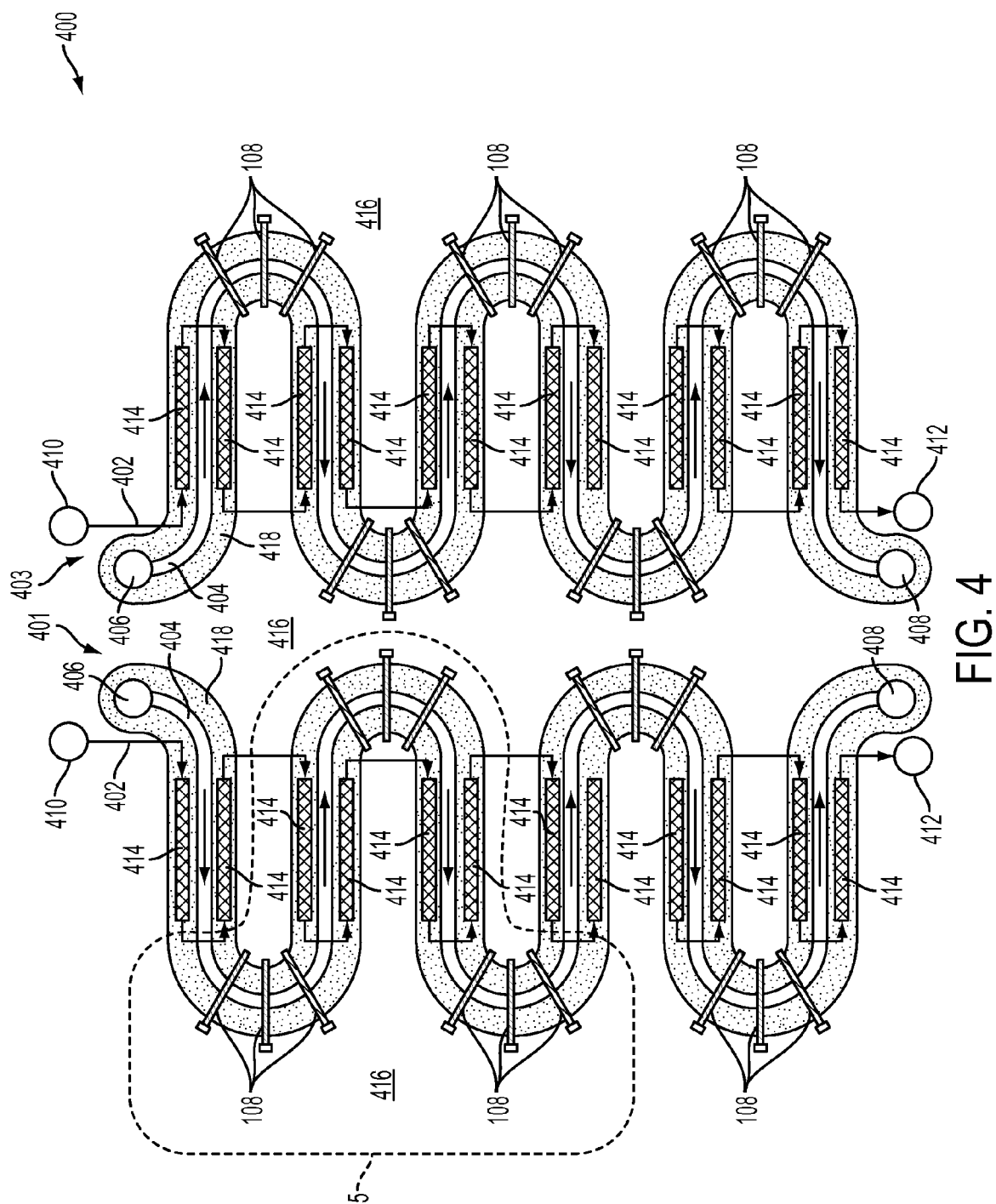
FIG. 4 illustrates a top view of a portion of another exemplary embodiment of an electro-optical modulator device.

FIG. 4 illustrates a top view of a portion of another exemplary embodiment of an electro-optical modulator device 400. The device 400 includes modulation paths 401 and 403. Each modulation path 401 and 403 includes a conductive line 404 and a waveguide portion 402. The conductive lines 404 are connected to push-pull RF inputs 406 and push-pull RF outputs 408. The waveguide portions 402 are connected to optical signal input portions 410 and optical signal output portions 412. The optical signals are modulated by the RF signals in interaction or modulation regions 414. A plurality of tuning portions 108 are arranged over portions of the conductive lines 404. The tuning portions 108 connected to ground regions 416 and are insulated from the conductive lines 404. The conductive lines 404 are isolated from the ground regions 416 by insulator regions 418. The operation of the device 400 is similar to the operation of the exemplary embodiments described above and is described in further detail in FIG. 5 below.

Figure 5:
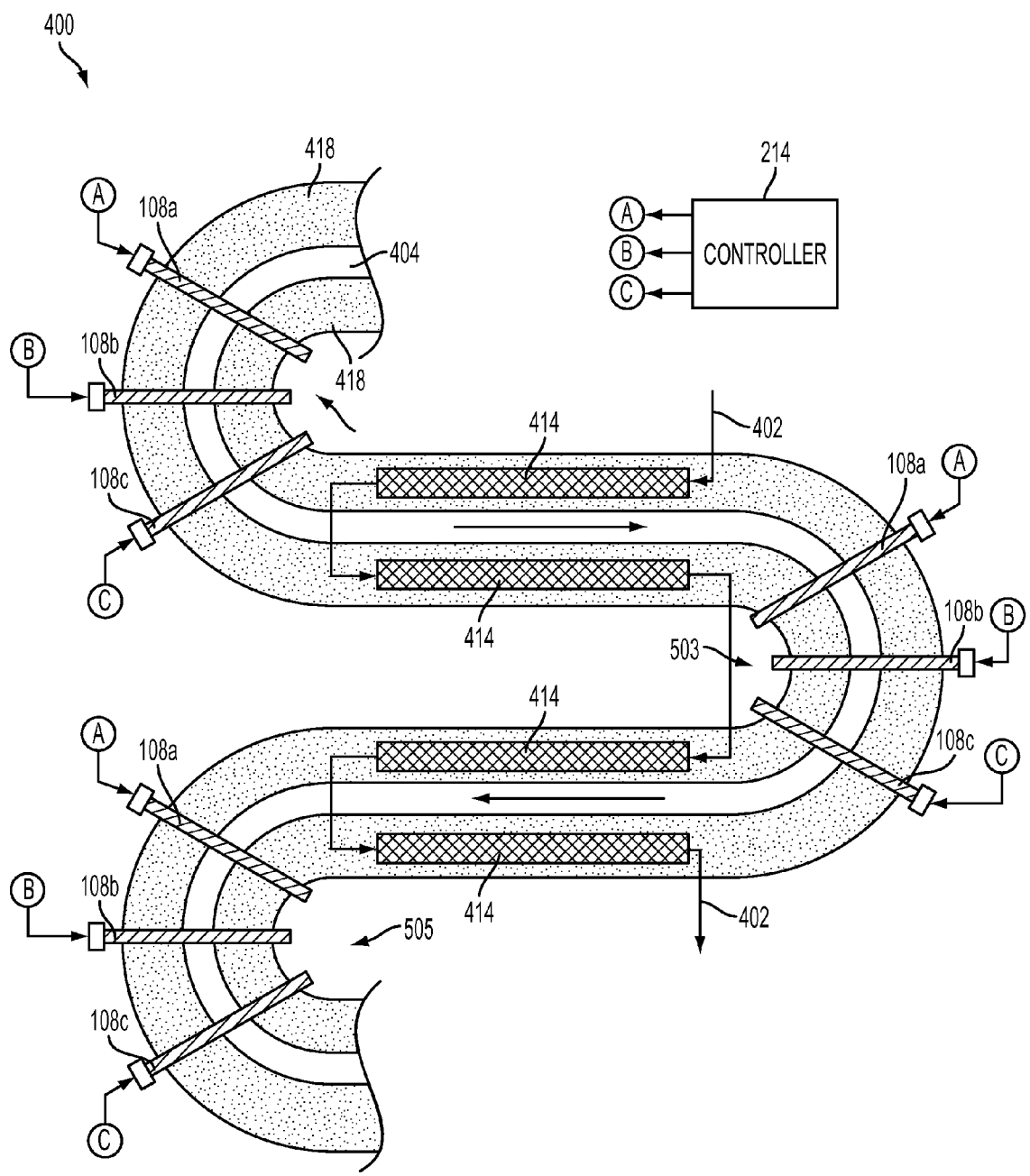
FIG. 5 illustrates a portion of an exemplary embodiment of the device in the region 5 (of FIG. 4).

FIG. 5 illustrates a portion of an exemplary embodiment of the device 400 in the region 5 (of FIG. 4). In this regard, the tuning portions 108a, 108b, and 108c are arranged in respective groups 501, 503, and 505 each communicatively connected and controlled by the controller 214 such that the controller 214 may selectively change the states of the switching devices 110 (of FIG. 2) for each of the plurality of tuning portions 108a, 108b, 108c in each group 501, 503, and 505.

Figure 6:
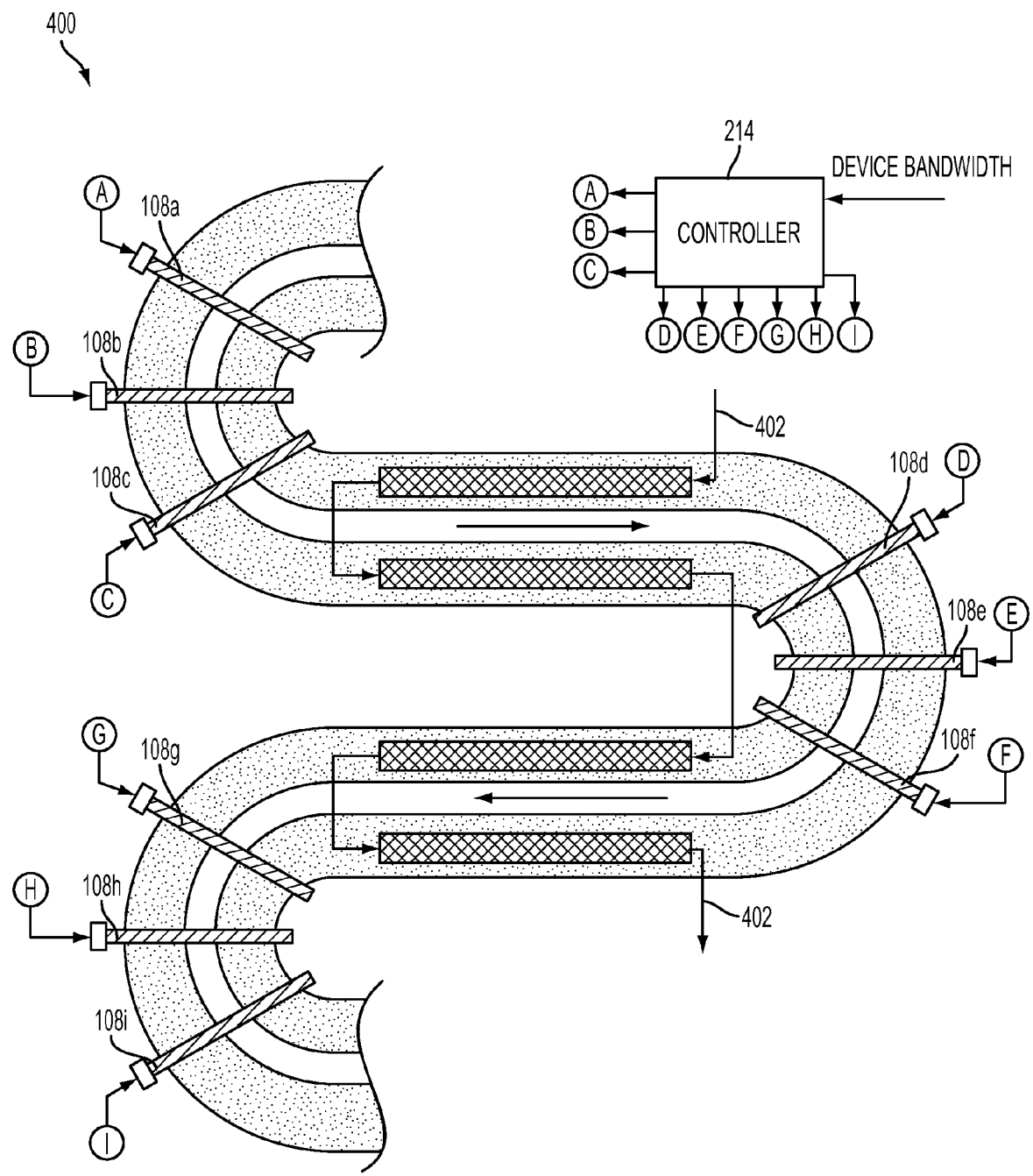
FIG. 6 illustrates another alternate exemplary embodiment of the device in the region 5 (of FIG. 4).
Figure 7:
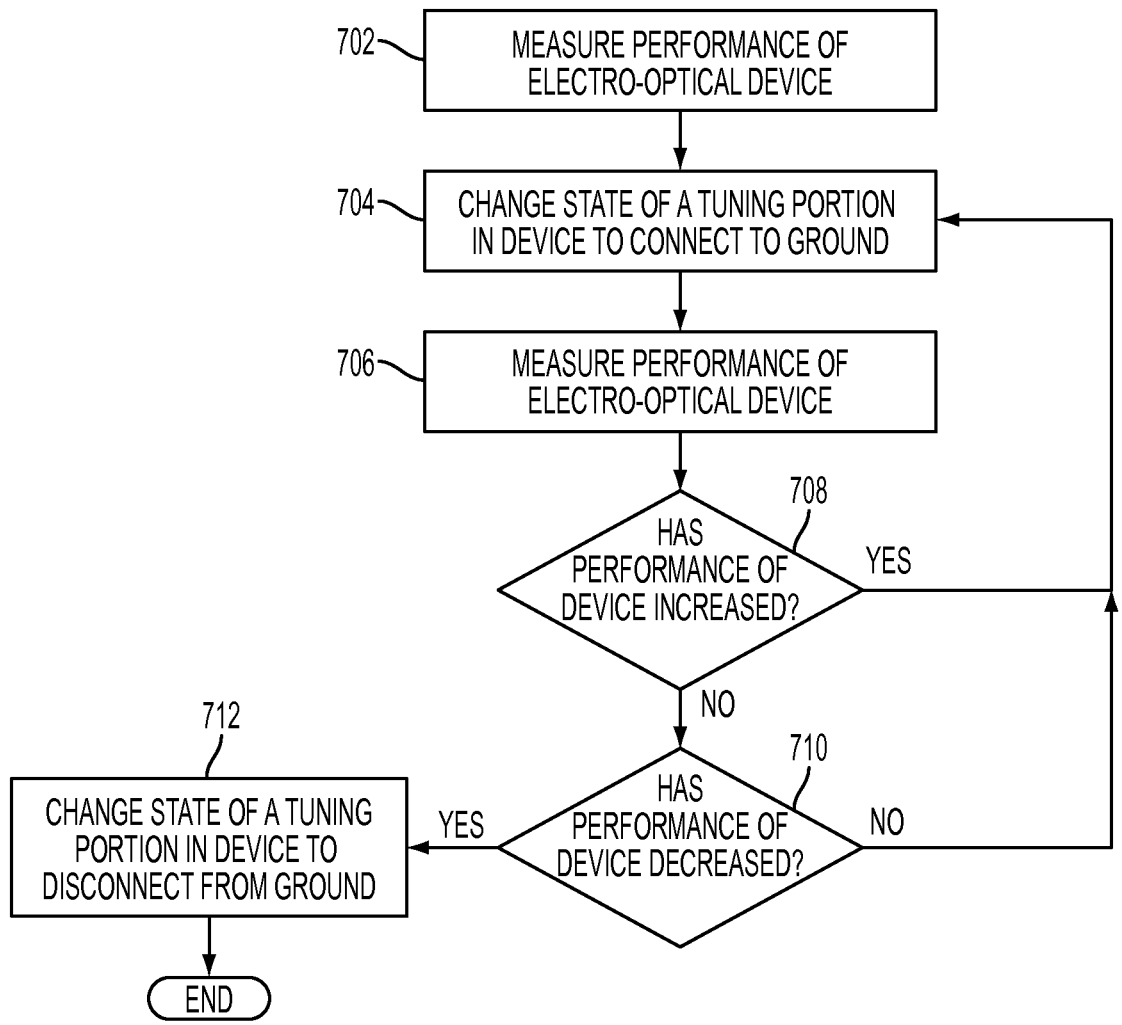
FIG. 7 illustrates a block diagram of an exemplary method for operating the electro-optical devices.

FIG. 6 illustrates another alternate exemplary embodiment of the device 400 in the region 5 (of FIG. 4). In this regard, the tuning portions 108a, 108b, 108c, 108d, 108e, 108f, 108g, 108h, and 108i are each communicatively connected and independently controlled by the controller 214 such that the controller 214 may selectively change the states of the switching devices 110 (of FIG. 2) for each of the plurality of tuning portions 108a, 108b, 108c, 108d, 108e, 108f, 108g, 108h, and 108i individually. Each of the controller portions 214 may be operative to receive a signal indicative of a performance measurement (performance metric) of the device as shown in FIG. 7, such as, for example, a measured bandwidth of the device 400 or a measurement of a modulation penalty of the device. The signal may be used in some embodiments to control the device 400 as described below. A modulation penalty is defined for a specific modulation format. There are many types of modulation formats, for example, non-return to zero (NRZ), differential phase shift keying (DPSK) and multi-level coding (PAM4 or PAM8). For example, for NRZ the modulation penalty is defined as Extinction ratio converts to modulation penalty, PowerPenalty=$10*\text{Log}[(ER-1)/(ER+1)]$, where ER is the extinction ratio, which is the ratio of the power in a 'zero' bit divided by the power in a 'one' bit.

FIG. 7 illustrates a block diagram of an exemplary method for operating the electro-optical devices described above. In this regard, in block 702, the performance of the electro-optical device is measured. Once the performance of the device is measured, the state of a tuning portion 108 (of FIG. 1) is changed to connect the tuning portion 108 to ground by changing the state of the switch devices 110 with, for example, the controller 214. In block 706, the performance of the electro-optical device is measured. In block 708, if the performance of the electro-optical device has increased (e.g., the first measured bandwidth in block 702 is compared with the second measured bandwidth of block 706 to determine if the second measured bandwidth is greater than the first measured bandwidth), the processes in blocks 704 and 706 may be repeated. In block 710, if the performance of the electro-optical device has not increased, whether the performance of the device has decreased is determined. If yes, the state of a tuning portion 108 of the device may be changed to disconnect the tuning portion 108 from ground by, for example, opening the switching devices 110 in block 712. The method described in FIG. 7 may be performed by, for example, the controller 214 receiving an input indicative of the performance of the electro-optic device, or a technician who sends inputs to the controller 214 to control the states of the tuning portions 108.

Alternately, a quality (or qualities) of a data transmission could be monitored real-time and used as the input information for the controller to appropriately modify which switches are turned on and how the electro-optic modulator bandwidth should be configured. Furthermore, if the transmission system is a mesh network with optical add-drop modules, the quality of the existing data within the network may be monitored so that the data added to the network can be made to have distortion similar to that travelling through the optical add-drop module.

Once the states of the tuning portions 108 have been set, the states may, in some exemplary embodiments, be dynamically changed while the electro-optical device is modulating optical signals in normal operation, or the states may be set or calibrated for a particular mode of operation.

Though the illustrated exemplary method of FIG. 7 includes increasing the performance of the device by changing states of the tuning portions 108, it may be desirable in some embodiments to reduce the performance of the device (e.g., reduce the bandwidth of the device). In this regard, a similar logical method is performed where the states of the tuning portions 108 are changed to reduce the performance of the device to a desired performance level.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An electro-optical modulator device comprising:
    an optical signal path partially defined by a waveguide portion;
    a radio frequency (RF) signal path partially defined by a conductive line portion;
    an interaction region where an RF signal propagating in the RF signal path interacts with an optical signal propagating in the optical signal path to modulate the optical signal; and
    a first tuning portion arranged proximate to the conductive line portion, the first tuning portion including a conductive portion, a first switch portion and a second switch portion, each of the first switch portion and the second switch portion connected to the conductive portion and ground.

2. The device of claim 1, wherein the conductive portion is disposed in an arrangement overlapping the conductive line portion.

3. The device of claim 1, wherein the conductive portion of the first tuning portion is electrically isolated from the conductive line portion.

4. The device of claim 1, further comprising a second tuning portion, the second tuning portion including a conductive portion and a switch portion operative to connect the conductive portion to ground.

5. The device of claim 1, further comprising a controller portion communicatively connected to the switch portion of the first tuning portion, the controller portion operative to control a state of the switch portion.

6. The device of claim 4, further comprising a controller portion communicatively connected to the switch portion of the first tuning portion and the switch portion of the second tuning portion, the controller portion operative to control a state of the switch portion of the first tuning portion and a state of the switch portion of the second tuning portion.

7. An electro-optical modulator device system comprising:
    an optical signal path partially defined by a waveguide portion;
    a radio frequency (RF) signal path partially defined by a conductive line portion;
    an interaction region where an RF signal propagating in the RF signal path interacts with an optical signal propagating in the optical signal path to modulate the optical signal;
    a first tuning portion arranged proximate to the conductive line portion, the first tuning portion including a conductive portion, a first switch portion and a second switch portion, each of the first switch portion and the second switch portion connected to the conductive portion and ground; and a controller portion communicatively connected to the switch portion of the first tuning portion, the controller portion operative to control a state of the switch portion.

8. The system of claim 7, wherein the conductive portion is disposed in an arrangement overlapping the conductive line portion.

9. The system of claim 7, wherein the conductive portion of the first tuning portion is electrically isolated from the conductive line portion.

10. The system of claim 7, further comprising a second tuning portion, the second tuning portion including a conductive portion and a switch portion operative to connect the conductive portion to ground.

11. The system of claim 10, wherein the controller portion is communicatively connected to the switch portion of the first tuning portion and the switch portion of the second tuning portion, the controller portion operative to control a state of the switch portion of the first tuning portion and a state of the switch portion of the second tuning portion.

12. An electro-optical modulator device comprising:
a substrate;
a radio frequency (RF) signal path partially defined by a conductive line portion arranged on the substrate;
an optical signal path partially defined by a waveguide portion arranged on the substrate;
an interaction region where an RF signal propagating in the RF signal path interacts with an optical signal propagating in the optical signal path to modulate the optical signal; and
a first tuning portion arranged on the substrate proximate to the conductive line portion, the first tuning portion including a conductive portion, a first switch portion and a second switch portion, each of the first switch portion and the second switch portion connected to the conductive portion and ground.

13. The device of claim 12, wherein the conductive portion is disposed in an arrangement overlapping the conductive line portion.

14. The device of claim 12, wherein the conductive portion of the first tuning portion is electrically isolated from the conductive line portion.

* * * * *